H. A. HOKE.
LOCOMOTIVE BRAKE.
APPLICATION FILED MAR. 24, 1914.
1,099,922.
Patented June 16, 1914.
2 SHEETS—SHEET 1.
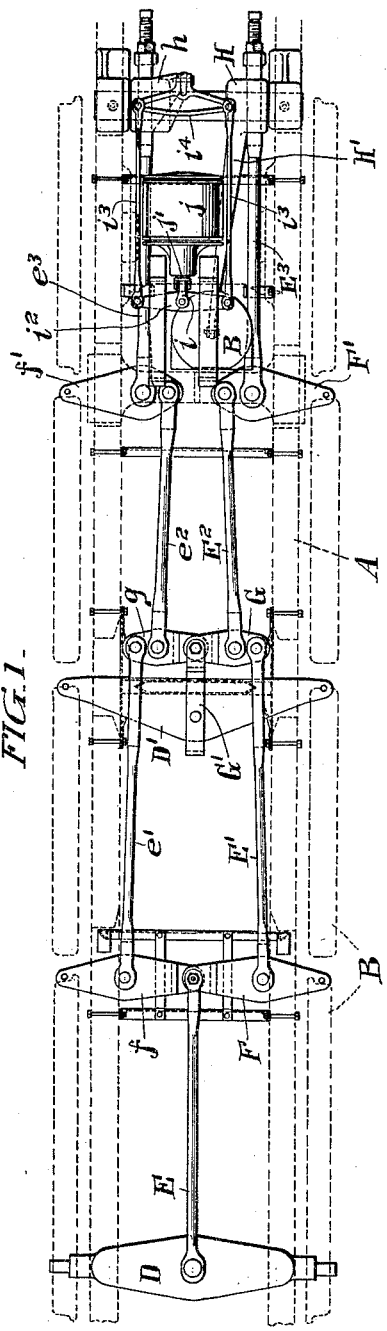
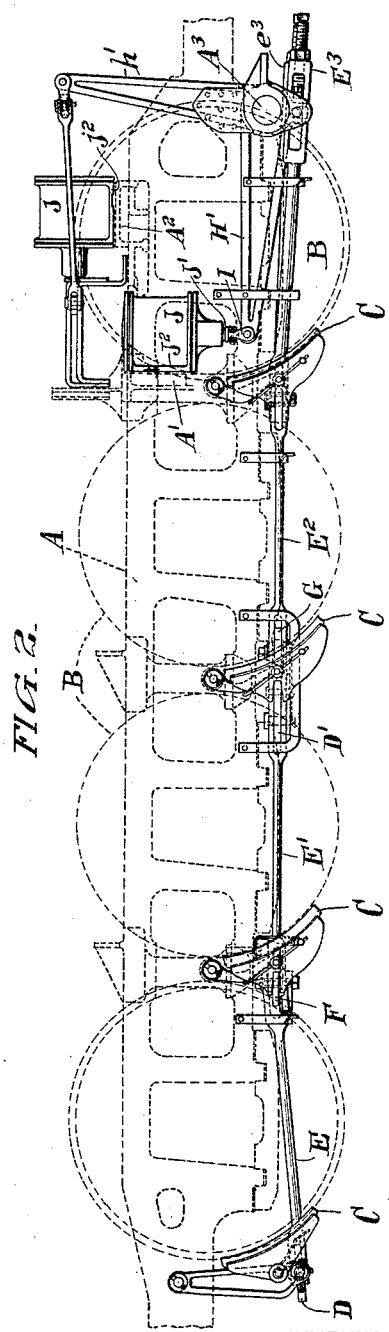

H. A. HOKE.
LOCOMOTIVE BRAKE.
APPLICATION FILED MAR. 24, 1914.
1,099,922.  Patented June 16, 1914.
2 SHEETS—SHEET 2.
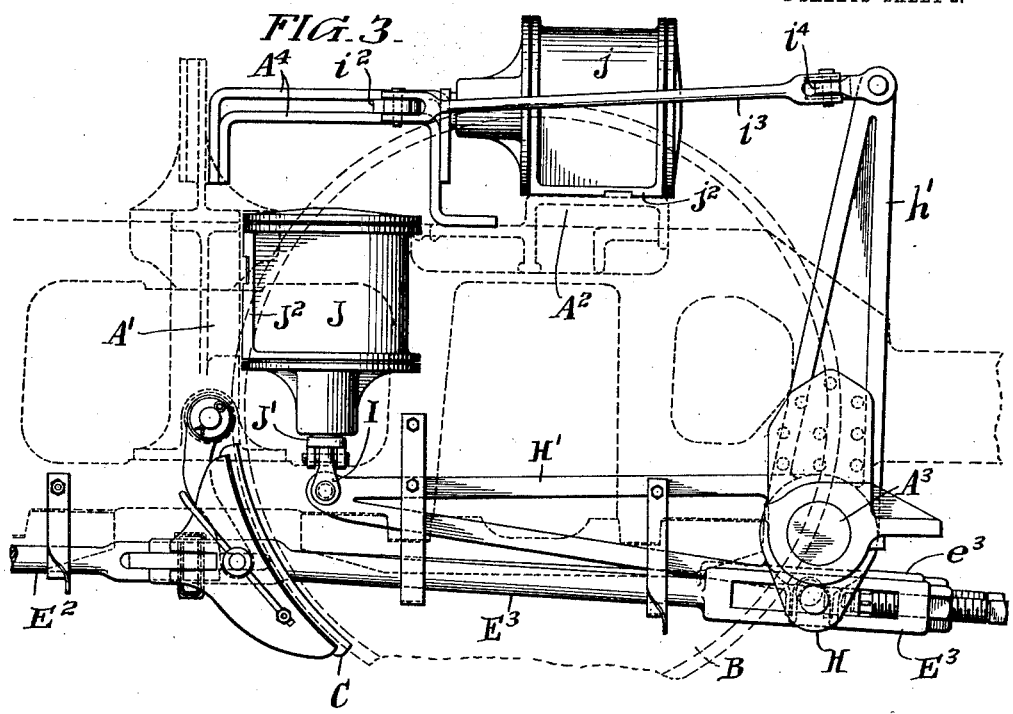
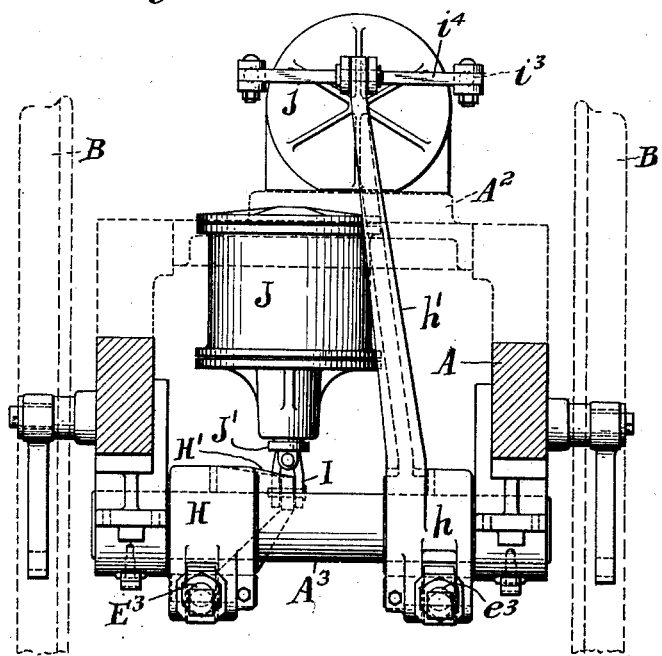

UNITED STATES PATENT OFFICE.

HARRY A. HOKE, OF ALTOONA, PENNSYLVANIA.

LOCOMOTIVE-BRAKE.

1,099,922.     Specification of Letters Patent.     Patented June 16, 1914.

Application filed March 24, 1914. Serial No. 826,890.

*To all whom it may concern:*

Be it known that I, HARRY A. HOKE, a citizen of the United States of America, residing in Altoona, in the county of Blair and State of Pennsylvania, have invented certain new and useful Improvements in Locomotive-Brakes, of which the following is a true and exact description, reference being had to the accompanying drawings, which form a part thereof.

My present invention relates to locomotive brakes, and particularly to the arrangement of the cylinders for actuating the driver brakes in a locomotive in which two brake cylinders are employed for this purpose.

Heretofore it has been the practice to employ two brake cylinders arranged side by side to actuate the driver brakes on certain classes of locomotives, but with certain types of heavy locomotives now coming into use it is difficult or impossible to arrange the two brake cylinders side by side, partly on account of the increased diameter which it is necessary to give the brake cylinders to enable them to operate with the desired power, and partly because the increased frame strength necessary in these heavy locomotives diminishes the available space in which the cylinders may be mounted.

The object of my invention is to provide a simple and effective arrangement which permits the brake actuating cylinders of a heavy locomotive of the kind referred to above to be located in convenient places where sufficient space is available; and which permits the cylinders to be placed, each with its center line nearer the center line of the locomotive than would be possible if the cylinders were mounted side by side.

The various features of novelty which characterize my invention are pointed out with particularity in the claims annexed to and forming a part of this specification. For a better understanding of the invention, however, and of the advantages possessed by it, reference should be had to the accompanying drawings and descriptive matter in which I have illustrated and described a preferred form in which my invention may be embodied.

Of the drawings: Figure 1 is a somewhat diagrammatic plan of a locomotive equipped with my invention; Fig. 2 is a somewhat diagrammatic elevation of the locomotive shown in Fig. 1; Fig. 3 is a partial side elevation, partly broken away and in section, of the locomotive shown in Figs. 1 and 2; and Fig. 4 is a partial end elevation with parts broken away and in section of the locomotive.

In the drawings, A represents the locomotive frame as a whole, and B represents the locomotive drivers, of which there are four pairs in the locomotive shown. There are one pair of brake shoes C for each pair of locomotive drivers. The brake rigging proper, in the particular form shown in the drawings, comprises a brake beam D connected at its ends to the brake shoes C for the rear pair of drivers. A connecting rod E is connected at one end to the center of the brake beam D, and at the opposite end is connected to the inner ends of a pair of short brake levers F, $f$. The outer end of the lever F is connected to the brake shoe C engaging the right hand rear intermediate driver wheel. The brake lever $f$ is connected at its outer end to the brake shoe C engaging the corresponding left hand driver. The levers F, $f$ are connected at their centers to connecting rods $E'$, $e'$, respectively. The connecting rods $E'$, $e'$, are connected at their front ends to short levers G, $g$, respectively. The levers G, $g$ are connected at their inner ends by a yoke $G'$ to the brake beam $D'$. The latter is connected at its ends to the brake shoes C engaging the front intermediate drivers. The levers G, $g$ are connected between their ends to connecting rods $E^2$, $e^2$, respectively. The rods $E^2$ and $e^2$ are connected at their front ends to the inner ends of brake levers $F'$ and $f'$, respectively. The levers $F'$ and $f'$ are connected at their outer ends to the brake shoes C for the front pair of drivers. A connecting rod $E^3$ is connected at its rear end to the lever F between the ends of the latter, and is connected at its front end to a rocker H journaled on a stationary shaft $A^3$ secured in and really forming a part of the locomotive frame, A. Similarly the rear end of a connecting rod $e^3$ is connected to the lever $f'$ between the ends of the latter, and the front end of the rod $e^3$ is connected to the rocker $h$ also journaled on the stationary shaft $A^3$.

The rocker H is formed with a horizontally disposed arm H′, which is connected at its outer end by the coupling member I to the brake actuating plunger J′ of the brake cylinder J. The latter has its axis vertically disposed and but slightly to the right of the center line of the locomotive. As shown, the brake cylinder J is formed with a flange $J^2$ secured against the vertical side of the cross portion A′ of the locomotive frame. The rocker $h$ is formed with a vertically disposed arm $h'$, which is connected to and actuated by the brake actuating plunger $j'$ of the brake cylinder $j$, which has its axis horizontally disposed, and but slightly to the left of the center plane of the locomotive. As shown, the cylinder $j$ is provided with a flange $j^2$ secured on the top of the cross portion $A^2$ of the locomotive frame. As shown, the connections between the plunger $j'$ and the rocker arm $h'$ comprise a coupling member $i$ connecting the plunger $j'$ to a lever $i^2$, connecting rods $i^3$ lying at opposite sides of the cylinder $j$ and connecting the ends of the lever $i^2$ to the ends of the lever $i^4$. The latter is directly connected to the upper end of the rocker arm $h'$. As shown, the lever $i^2$ slides in guides $A^4$ secured to the locomotive frame.

In the preferred arrangement shown, the axis of the shaft $A^3$ on which the rockers H and $h$ turn is located well in front of, and slightly beneath the axis of the front drivers. The axis of the vertical cylinder J is located well to the rear of the axis of the front drivers, while the cylinder $j$ is located well above the axis of the front drivers. The rocker arms H and $h$ are inclined so that their free ends are in line with the axes of the cylinders J and $j$, respectively, while the rockers proper are in line with the connecting rods $E^3$ and $e^3$. The rockers H and $h$ are readily made stiff enough, and with sufficient bearing surface on the shaft $A^3$, so that the lateral displacement of the free end of each rocker arm (H′, $h'$) relative to the connection of the rocker to the corresponding connecting rod ($E^3$, $e^3$) will neither bend the rocker arm, nor create an undesirable binding of the rocker on the shaft $A^3$. In the arrangement described the brake actuating cylinders J and $j$ may be made of ample size to provide sufficient braking power with the usual relatively short travel of the brake cylinder pistons, and the cylinders are conveniently disposed in locations where sufficient space is available. The center of gravity of each of these cylinders is close to the central plane of the locomotive, as is desirable. As shown in Fig. 4, the two cylinders are located at opposite sides of said central plane but at a distance therefrom appreciably less than the radius of the cylinder in each case.

While in accordance with the provisions of the statutes I have illustrated and described the best form of my invention now known to me, it will be apparent to those skilled in the art that changes may be made in the form of apparatus disclosed without departing from the spirit of my invention, and that under some conditions certain features of my invention may be used without a corresponding use of other features.

Having now described my invention, what I claim as new and desire to secure by Letters Patent, is:

1. In a locomotive, the combination with the frame and drivers of a brake mechanism comprising a pair of rockers provided one with a horizontally disposed arm and the other with a vertically disposed arm, a brake cylinder mounted on said frame with its axis horizontal and connected to and actuating said vertically disposed arm and a second brake cylinder mounted on said frame with its axis vertical and connected to and actuating said horizontally disposed arm.

2. In a locomotive, the combination with the frame and the drivers thereof, of two brake actuating cylinders one having its axis horizontal and being mounted on said frame above the axis of the front pair of drivers, and the other having its axis vertical and being mounted on the frame at the rear of the axis of the front pair of drivers, a pair of rockers journaled in said frame to turn about an axis in front of the axis of the front pair of drivers and each connected to and actuated by a corresponding one of said cylinders, and brake operating mechanism connected to the two rockers.

3. In a locomotive, the combination with the frame and drivers of a brake mechanism comprising a pair of coaxial spaced apart rockers provided one with a horizontally disposed arm and the other with a vertically disposed arm, a brake cylinder mounted on said frame with its axis horizontal and connected to and actuating said vertically disposed arm and a second brake cylinder mounted on said frame with its axis vertical and connected to and actuating said horizontally disposed arm, said cylinders having their axes located at opposite sides of the central longitudinal plane of the locomotive but at a distance therefrom appreciably less than the radius of each cylinder.

4. In a locomotive, the combination with the frame and drivers of a brake mechanism comprising a pair of coaxial spaced apart rockers provided one with a horizontally disposed arm and the other with a vertically disposed arm, a brake cylinder mounted on said frame with its axis horizontal and connected to and actuating said vertically disposed arm and a second brake cylinder mounted on said frame with its axis vertical and connected to and actuating said horizontally disposed arm, said cylinders having their axes located at opposite sides of the central longitudinal plane of the locomotive but at a distance therefrom appreciably less than the radius of each cylinder, and said arms being bent away from the central plane of the locomotive whereby the rockers are spaced apart a distance greater than the distance between the axes of said cylinders.

HARRY A. HOKE.

Witnesses:
J. L. WERTZBERGER,
J. T. HANLON.

---

Copies of this patent may be obtained for five cents each, by addressing the "Commissioner of Patents, Washington, D. C."